(No Model.) 2 Sheets—Sheet 2.
E. B. MEYROWITZ.
ADJUSTABLE SUPPORT FOR OPTICAL INSTRUMENTS.
No. 603,148. Patented Apr. 26, 1898.
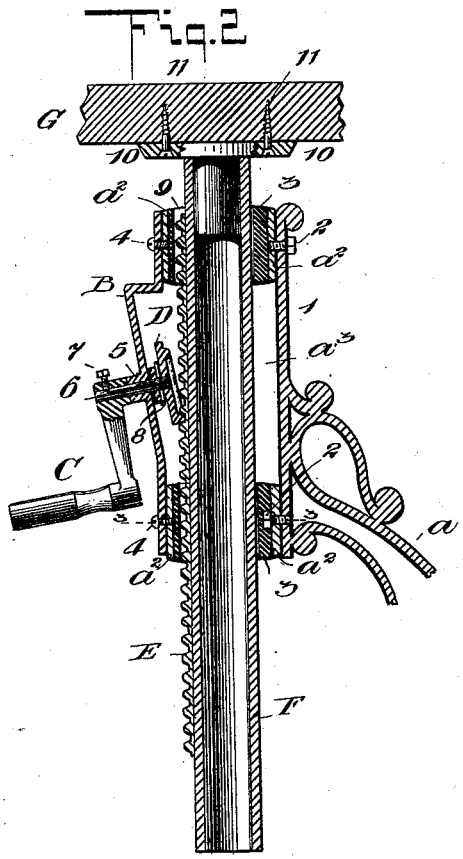
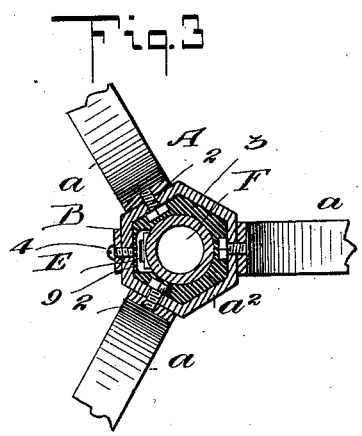
Witnesses:
Edmund A. Shanse
George M. Whitney
Inventor
Emil B. Meyrowitz
by his Attorney,
THE NORRIS PETERS CO., PHOTO-LITHO., WASHINGTON, D. C.

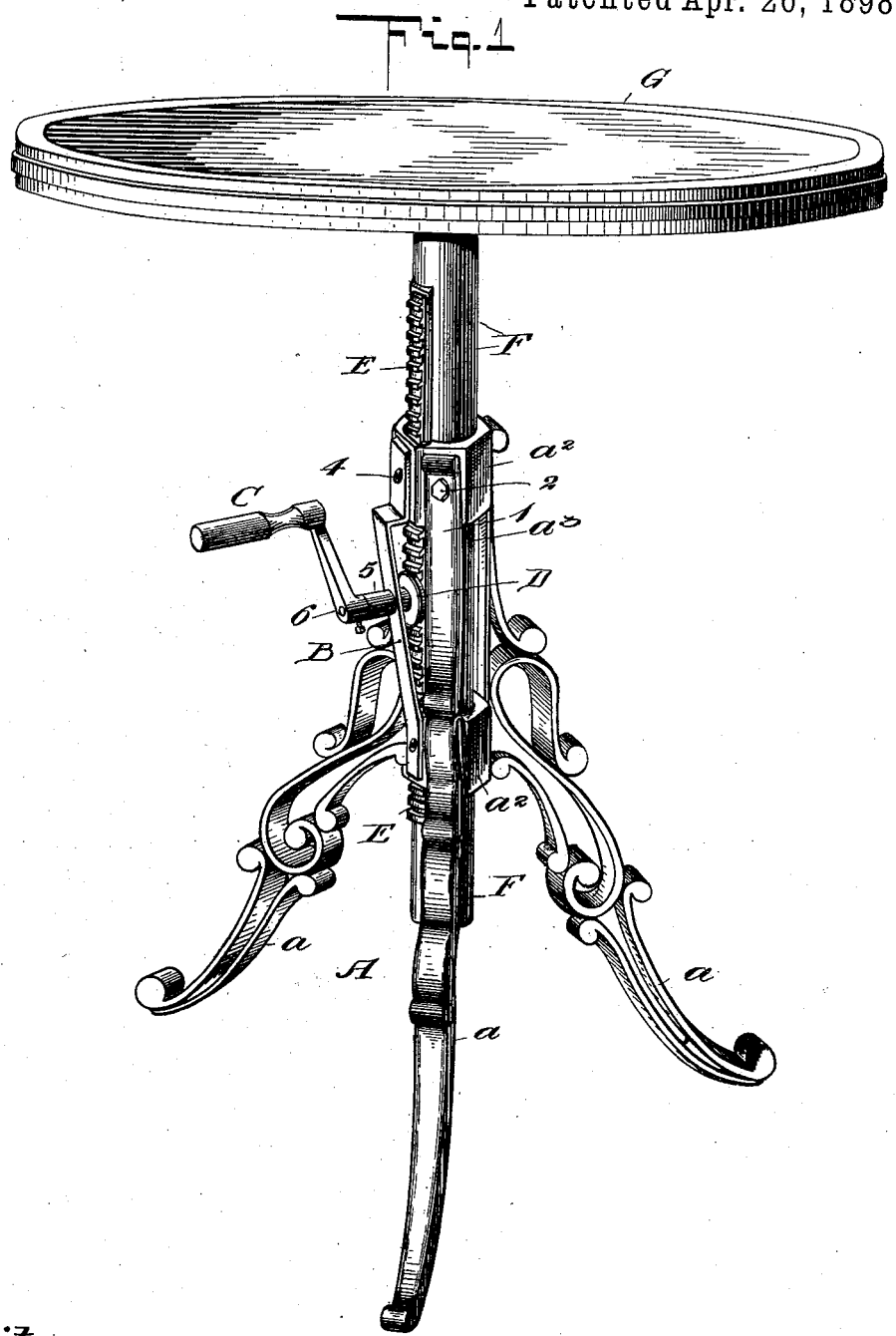

UNITED STATES PATENT OFFICE.

EMIL B. MEYROWITZ, OF RIDGEFIELD, NEW JERSEY, ASSIGNOR TO THE MEYROWITZ MANUFACTURING COMPANY, OF SAME PLACE.

ADJUSTABLE SUPPORT FOR OPTICAL INSTRUMENTS.

SPECIFICATION forming part of Letters Patent No. 603,148, dated April 26, 1898.

Application filed February 1, 1897. Serial No. 621,506. (No model.)

*To all whom it may concern:*

Be it known that I, EMIL B. MEYROWITZ, a citizen of the United States of America, and a resident of Ridgefield, in the State of New Jersey, have invented a new and useful Improvement in Adjustable Supports for Optical Instruments, of which the following is a specification.

This invention relates to adjustable supports for telescopes and the like, as well as to adjustable tables upon which to rest microscopes and like smaller instruments.

The invention consists in a metallic foot or stand of novel construction, preferably in the form of a tripod.

The leading object of the invention is to provide a true and smooth guide for a vertically-adjustable central stem in a support for optical instruments.

Two sheets of drawings accompany this specification as parts thereof.

Figure 1 of the drawings is a perspective view of a table for optical instruments embodying my improved adjustable support. Fig. 2 represents a fragmentary vertical section through the stand and the sliding stem; and Fig. 3 represents a horizontal section on the line 3 3, Fig. 2.

Like letters and numbers refer to like parts in the several figures.

The stand (shown at A) is preferably constructed in the form of a tripod, as aforesaid, and is so represented. It comprises legs $a$, preferably in the form of ornate iron castings, having vertical extensions 1 at their upper ends, and collars $a^2$, (one or more,) preferably two in number, with a space $a^3$ between, and constructed in the form of hexagonal iron rings arranged between the upper ends of the legs $a$ and their extensions 1 and fastened thereto by screws 2, Figs. 2 and 3, so as to be tightly held between said legs and leg extensions, while they (said collars with said screws) serve to securely unite the legs with each other. To form a true and smooth guide within said collars $a^2$ and at the same time to fasten said screws 2 in the lower collar, where they are inserted from within outwardly, so as to preclude any loosening of the joints of the stand, the collars are provided with Babbitt-metal bushings 3, Figs. 2 and 3, after the castings are assembled.

Diametrically opposite the extension 1 of one of the legs $a$ a bracket B is attached to the collars $a^2$ by screws 4 at its ends and is provided at an intermediate point with a drilled boss 5, perpendicular to an oblique portion of the bracket, to form a bearing for a rotatable shaft 6, which projects obliquely downward and upon the outer and inner ends of which a hand-crank C and a crown worm-gear D are fastened by a screw 7 and a pin 8, respectively. Said worm-gear D meshes with a longitudinal rack E, fast on the vertically-sliding stem F, to which the guide formed within the collars $a^2$ is fitted, and the Babbitt-metal bushings 3 of the collars are recessed, as shown at 9 in Figs. 2 and 3, to clear said rack. Said stem F is preferably in the form of a hollow metallic tube and provided at its upper end with a plug $f$, Fig. 2, having an attaching-flange 10 or its equivalent for attaching the stem by suitable fastenings 11 to a table-top G or to a convenient part of the upper frame of a telescope or other optical instrument requiring an individual support.

After the stem F is lowered into its guide within the stand A it is only necessary to turn the crank C to the right or left in order to quickly raise or lower the stem and the superposed instrument or instruments, and when the hand is removed from the crank, the worm of the worm-gear D being at all times interlocked at bottom between two teeth of the rack E, the stem and its load are held securely at the height to which they were moved.

The crank C is conveniently left after each adjustment of the table in the position in which it is shown in Fig. 2, where it retains its position by gravity and, projecting inward, is effectively masked by the upper ends of the legs $a$, so as to be free from liability to disturbance.

The number of the legs $a$ may be increased, if preferred, and a single collar $a^2$, or more than two such collars, may be employed, as above suggested. A different adjusting mechanism may in some cases be substituted for the worm-gear and rack above described and other antifriction material for Babbitt metal, and other like modifications will suggest themselves to those skilled in the art.

Having thus described the said improvement, I claim as my invention and desire to patent under this specification—

In an adjustable support for optical instruments, a metallic stand of tripod or like form comprising upwardly-converging legs, a guide-forming collar between the upper ends of such legs, headed screws inserted from within outwardly to fixedly unite said legs and collar, and a bushing of Babbitt metal or the like within said collar which fastens said screws and forms a central guide-bore, substantially as hereinbefore specified.

EMIL B. MEYROWITZ.

Witnesses:
P. A. MEYROWITZ,
JEAN SCHMIDT.